United States Patent [19]

Kinjo

[11] Patent Number: 4,488,183
[45] Date of Patent: Dec. 11, 1984

[54] COPY-PROOF RECORDING MEDIUM AND DEVICE FOR ADDING COPY-PROOF INTERFERENCE SIGNAL

[75] Inventor: Hisao Kinjo, Yokohama, Japan

[73] Assignee: Victor Company of Japan, Limited, Yokohama, Japan

[21] Appl. No.: 313,691

[22] Filed: Oct. 21, 1981

[30] Foreign Application Priority Data

Oct. 27, 1980 [JP] Japan ................................ 55-150437
Oct. 29, 1980 [JP] Japan ................................ 55-151818

[51] Int. Cl.³ .......................... H04N 7/16; H04N 5/76
[52] U.S. Cl. .................................... 358/319; 358/120; 360/37.1; 360/60
[58] Field of Search ............... 358/120, 145, 147, 310, 358/319, 335; 360/33.1, 37.1, 60

[56] References Cited

U.S. PATENT DOCUMENTS

| | | | |
|---|---|---|---|
| 2,268,001 | 12/1941 | Felgel-Farnholz | 358/145 |
| 2,563,684 | 8/1951 | Lord | 358/145 |
| 2,624,797 | 1/1953 | Lawson et al. | 358/145 |
| 3,423,520 | 1/1969 | Kelly | 358/145 |
| 3,532,808 | 10/1970 | Fujisawa | 360/37.1 |
| 3,824,332 | 7/1974 | Horowitz | |
| 3,963,865 | 6/1976 | Songer | 360/37.1 |
| 4,100,575 | 7/1978 | Morio et al. | 358/120 |
| 4,163,253 | 7/1979 | Morio et al. | 358/120 |

FOREIGN PATENT DOCUMENTS

54-108612 8/1979 Japan ................................ 358/120

Primary Examiner—Donald E. McElheny, Jr.
Attorney, Agent, or Firm—Pollock, VandeSande & Priddy

[57] ABSTRACT

A copy-proof interference signal or signals is/are added to the composite color video signal to be recorded on a recording medium in the vicinity of the horizontal synchronous signal. The interference signal comprises a pulse having a narrow width compared to the width of the horizontal synchronous signal pulse. A negative going pulse may also be added to the front porch of the horizontal synchronous signal so as to compensate for area-decrease of the horizontal synchronous signal due to the addition of an interference signal. The interference signal may be added to the video signal region which is close to the leading edge of the horizontal synchronous signal so that the interference signal does not cause the occurrence of noises or distortion in a reproduced picture. When the interference signal-added composite color video signal is directly applied to a monitor TV, satisfactory color pictures can be obtained as usual. However, when the signal reproduced from the recording medium is once recorded by a video tape recorder (VTR), only nonpractical color pictures can be obtained with the signal from the VTR because the phase-restoring operation of chromatic signal on reproduction is disturbed by the interference signal.

12 Claims, 34 Drawing Figures

COPY-PROOF RECORDING MEDIUM AND DEVICE FOR ADDING COPY-PROOF INTERFERENCE SIGNAL

BACKGROUND OF THE INVENTION

This invention generally relates to prerecorded recording media, such as video disks, video tapes and the like, from which the recorded information is copied by a video tape recorder, and to a device for adding a copy-proof interference signal, which will prevent copying from the recorded recording media, to a composite color video signal to be recorded on the media.

Recently, various types of recording/reproducing systems have been proposed for recording and reproducing various information signals at a high density. Magnetic recording/reproducing apparatus, such as a video tape recorder (VTR) utilizing a magnetic tape as a recording medium; a color VTR using so called phase shift method (PS method) as described in detail, for instance, in Japanese Patent Provisional Publication No. 52-48919; a color magnetic video recording/reproducing device using so called phase invert method (PI method) as described in detail, for instance, in Japanese Patent Provisional Publication No. 50-34419; or the like are being popularized as home use magnetic video recording/reproducing devices (which will be referred to as home-use VTRs hereinbelow) throughout the world. As a high density recording/reproducing system using a disk-like recording medium, various systems have been developed; for instance, one in which reproduction is performed magnetically, one in which reproduction is performed optically, one in which reproduction is performed by detecting the variation in electrostatic capacitance, one in which reproduction is performed by using a piezoelectric element and others. Among other things, one in which reproduction is performed optically and one in which reproduction is performed by detecting the variation in electrostatic capacitance have reached a step which is expected to be greatly progressed to practical use.

A problem in connection with the popularization of home-use VTRs is that the recording contents of a recorded recording medium is readily copied or duplicated by a home-use VTR since a reproduced signal from a recorded recording medium, such as a recorded magnetic tape, a video disk or the like, can be easily recorded by a home-use VTR because of the fact that a home-use VTR per se has a recording function.

It is apparent that if the present circumstances allowing free copying, duplicating or stealing of the recording contents of a recorded recording media by home-use VTRs are left as they stand, it will cause serious damages to the production and selling industries, authors, and other relating parties. However, copyright law does not prohibit copying for private use by prescribing as to copying for private use as, "A work which is an objective of copyright, can be copied by a user if he intends to use it personally or at home or in a limited scope similar to such purposes." Therefore, it is inevitable that the recorded contents of recorded magnetic tapes or video disks are stolen on a limited scale. Therefore, it can be readily predicted that the same problem as the fact that authors, musicians, producers, phonograph record industry are influenced seriously by personal steal-copying which has been a problem in connection with phonograph records, will arise in connection with recorded magnetic recording tapes and video disks. Thus it can be predicted that video disk players, which do not have a recording function, cannot compete with home-use VTRs having a recording function, and therefore, popularization and development of video disks will be seriously affected.

In this way, the fact that copies are produced by readily stealing the contents of recorded media by VTRs will seriously damage various relating industries and relating persons. It is well known that an effective countermeasure has been desired, for this reason, for making it impossible to make copies by stealing the contents of recorded recording media.

It is also well known that many proposals have been made hitherto, in order to make it difficult to steal the contents of a recorded medium, from the viewpoint that a normal picture can be obtained when a reproduced signal from a recorded medium is directly applied to a monitor image receiver, and on the other hand, when the reproduced signal from the recorded medium is once recorded by a VTR, a satisfactory reproduced picture will not be imaged on the monitor image receiver with the reproduced signal from the VTR.

It is often experienced, in connection with the information contents, that in the case that an information signal recorded on a recorded medium is a composite color video signal, its value is appreciated only when it is imaged on a monitor image receiver as a color TV image, and if the signal is imaged as a black and white image on a monitor image receiver, it is of no value. In such a case, steal-copying is invalidated by making sure that a clear color TV picture is imaged on a monitor image receiver when the reproduced signal from the recorded medium is directly applied to the monitor image receiver, and on the other hand, when the reproducing signal from the recorded medium is once recorded by a VTR, and is applied to the monitor image receiver after being reproduced, only a black and white picture is imaged on the monitor image receiver. Furthermore, invalidation of steal-copying can be satisfactorily achieved if it is arranged such that when the reproduced signal from the recorded medium is once recorded by a VTR, and is applied to a monitor image receiver after being reproduced, the original normal colored TV picture is not imaged on the monitor image receiver but a color TV picture of scrambled or confused colors is imaged on the monitor image receiver.

In some conventional prerecorded video tapes, the magnitude of the vertical synchronous signal of the composite color video signal has been made relatively small so that vertical synchronization would not be satisfactorily obtained when the reproduced signal of the tape is once recorded by another VTR. Although such conventional method could prevent the contents of video tapes from being copied to other tapes when copying is made by a VTR, the conventional method has suffered from a fatal problem that vertical synchronization is apt to be lost when it is intended to directly reproduce the recorded information by a monitor TV. Furthermore, because of great progress in circuit techniques in VTRs in recent years, most VTRs now on the market are not affected by such a conventional copy-proof technique. Namely, the above-mentioned conventional copy-proof technique is not effective against recent VTRs.

SUMMARY OF THE INVENTION

The present invention has been achieved in order to remove the drawbacks and disadvantages inherent to the conventional copy-proof technique.

It is, therefore, an object of the present invention to provide a recording medium carrying information which is substantially prevented from being copied by a VTR, and a device for producing a copy-proof interference signal which will be added to the composite color video signal recorded on such a medium.

According to a feature of the present invention, one or more interference signals in the form of a pulse are added to the horizontal synchronous signal of the composite color video signal, where the position and magnitude of the pulse to be added are controlled so that the contents of the recording medium can be satisfactorily reproduced by a monitor TV and cannot be satisfactorily reproduced when reproduced from a VTR in the case that the contents are once recorded by the VTR.

In accordance with the present invention there is provided a copy-proof recording medium carrying a composite color video signal to which a copy-proof interference signal has been added, characterized in that said interference signal has a pulse width considerably smaller than the pulse width of the horizontal synchronous signal of said composite color video signal, and in that said interference signal is added at least one particular place, within or close to the horizontal synchronous signal, at a position which precedes the trailing edge of the horizontal synchronous signal and does not appear in the reproduced picture of an image receiver.

In accordance with the present invention there is also provided a device for adding at least one copy-proof interference signal to a composite color video signal, comprising: (a) first means responsive to the horizontal synchronous signal of said composite color video signal for producing a first pulse; (b) second means for defining the width of said first pulse; and (c) third means for adding said first pulse, whose width has been defined by said second means, to said composite color video signal, said first pulse having a pulse width considerably smaller than the pulse width of said horizontal synchronous signal, said first pulse being added at least one particular place, within or close to the horizontal synchronous signal, at a position which precedes the trailing edge of the horizontal synchronous signal and does not appear in the reproduced picture of an image receiver.

BRIEF DESCRIPTION OF THE DRAWINGS

The object and features of the present invention will become more readily apparent from the following detailed description of the preferred embodiments taken in conjunction with the accompanying drawings in which:

FIGS. 2(a) to 2(h) are waveform charts useful for understanding the operation of the circuitry of FIG. 1;

FIGS. 7(a) to 7(h) are waveform charts useful for understanding the operations of the circuits of FIGS. 5 and 6;

The same or corresponding elements and parts are designated at like numerals throughout the drawings.

DETAILED DESCRIPTION OF THE INVENTION

As is briefly described in the above, according to the present invention one or more interference signal are added to the horizontal synchronous signal of the composite color video signal which will be recorded on a master disk or tape, from which video disks or tapes are produced, in a particular manner as will be described hereinbelow. As a result, although the reproduced signal from a recording medium including such an interference signal can image a clear color TV picture on a monitor image receiver if the reproduced signal is directly applied to the monitor image receiver, in the case the reproduced signal from the recorded recording medium is once recorded by a home-use VTR and is then reproduced to be applied to the monitor image receiver, only black and white image, or a confused or scrambled color reproducing picture or image is obtained on the monitor image receiver.

Figure 1:
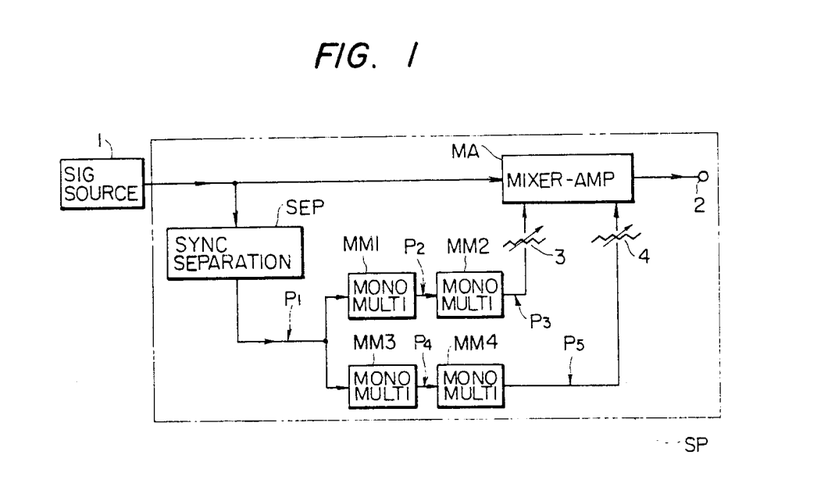
FIG. 1 is a schematic block diagram of an embodiment of the device for adding (an) interference signal(s) to the composite color video signal to be recorded on a recording medium.
Figure 2A:
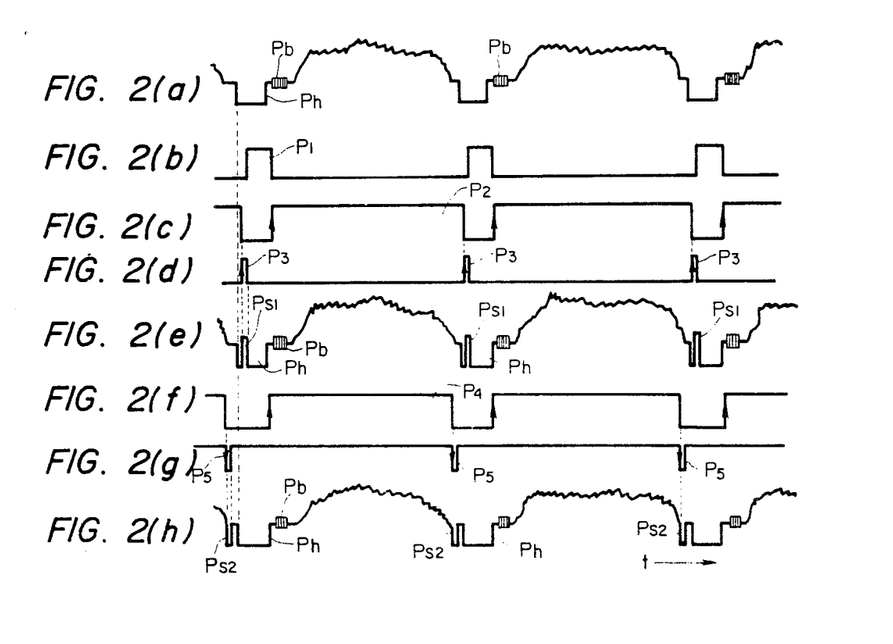

Referring now to FIG. 1, a schematic block diagram of an embodiment of the device, according to the present invention, for adding the above-mentioned copy-proof interference signal to the composite color video signal is shown. In FIG. 1, the reference numeral 1 is a composite color video signal source, and a composite color video signal of FIG. 2(a) is emitted from this signal source 1.

The signal source 1 may be any device as long as it is capable of emitting a composite color video signal having a given form, and therefore, the signal source 1 may be a video disk player. The composite color video signal of FIG. 2(a) emitted from the signal source 1 is applied to an interference signal adding circuit SP which is shown by a dotted line frame. By adding a given interference signal, which will be described later, at a given place in the horizontal synchronous signal, a composite color video signal which has been added with an interference signal Ps1 or an interference signal Ps2 respectively shown by FIG. 2(e) and FIG. 2(h) may be obtained at an output terminal 2.

The interference signal adding circuit SP shown in FIG. 1 comprises a synchronizing separation circuit SEP, monostable multivibrators MM1 through MM4, level adjusters 3 and 4, and a mixer-amplifier MA, and is arranged to emit a composite color video signal to which an interference signal having a given pulse width and amplitude is added at a given time position on the basis of a time position of the horizontal synchronous signal of the composite color video signal.

The above-mentioned synchronizing separation circuit SEP is employed for producing a pulse train signal synchronous with the horizontal synchronous signal. However, if the video signal to be recorded is separated from the horizontal synchronous signal so that the video signal and the horizontal synchronous signal are separately processed as in some recording apparatus, such a synchronizing separation circuit SEP is not required.

The composite color video signal of FIG. 2(a) is applied to the mixer-amplifier MA and to the synchronizing separation circuit SEP, and a horizontal synchronous pulse P1 of FIG. 2(b) is separated to be applied to the monostable multivibrators MM1 and MM3. The monostable multivibrators MM1 and MM3 are triggered at the instant of falling of the synchronous pulse P1, and the monostable multivibrator MM1 produces a pulse P2 of FIG. 2(c) which will be applied to the monostable multivibrator MM2, while the monostable multivibrator MM3 produces a pulse P4 of FIG. 2(f) which will be applied to the monostable multivibrator MM4.

The monostable multivibrator MM2 is triggered at the instant of falling of the above-mentioned pulse P2 to emit a pulse P3 of FIG. 2(d) and when it is applied via the level adjuster 3 to the mixer-amplifier MA, a composite color video signal, to which an interference signal Ps1 has been added in the horizontal synchronous signal Ph, is emitted such as shown in FIG. 2(e). The monostable multivibrator MM4 is triggered at the instant of falling of the above-mentioned pulse P4, to emit a pulse P5 such as shown in FIG. 2(g), and this is applied via the level adjuster 4 to the mixer-amplifier MA. As a result, a composite color video signal, to which an interference signal Ps2 has been added to the front porch of the horizontal synchronous signal Ph, is emitted such as shown in FIG. 2(h).

The position of addition of the interference signal Ps1 is defined by the output pulse P2 of the monostable multivibrator MM1, whereas the pulse width of the interference signal Ps1 is defined by the output pulse P3 of the monostable multivibrator MM2. Namely, the pulse widths of the pulses Ps1 and p2 may be changed by respectively varying the time constants of the monostable multivibrators MM1 and MM2. Furthermore, the amplitude of the interference signal Ps1 may be freely set by the adjustment of the level adjuster 3. In the same manner the position of addition, the pulse width and amplitude of the interference signal Ps2 may be freely set by varying the pulse widths of the output pulses P4 and P5 of the monostable multivibrators MM3 and MM4, and by the adjustment of the level adjuster 4.

A condition of adding an interference signal Ps1 of FIG. 2(e) is obtained when the output pulse P5 of the monostable multivibrator MM4 is not applied to the mixer-amplifier MA by the adjustment of the level adjuster 4, and a condition of adding an interference signal Ps2 of FIG. 2(h) is obtained when the output pulse P3 of the monostable multivibrator MM2 is not applied to the mixer-amplifier MA by the adjustment of the level adjuster 3. In the case that both the output pulse P3 of the monostable multivibrator MM2 and the output pulse P5 of the monostable multivibrator MM4 are applied to the mixer-amplifier MA as of a given amplitude, it is a matter of course that a composite color video signal, to which the interference signals Ps1 and Ps2 have been added, will be obtained.

In this way, in the interference signal adding circuit SP of FIG. 1, it is possible to add one or two interference signal(s) having given pulse width and amplitude to the horizontal synchronous signal Ph at one or two places indicative of given time positions. In the case of adding three or more interference signals to each horizontal synchronous signal pulse of the composite color video signal, it will be readily understood that all required is to add a monostable multivibrator to be triggered by the pulse P1 for determining the position of the interference pulse, a monostable multivibrator to be triggered by the output pulse of the above-mentioned position-determining monostable multivibrator for determining the width of the interference pulse, and a level adjuster for adjusting the amplitude of the output pulse of the above-mentioned pulse width-determining monostable multivibrator.

Although the interference signal adding circuit SP having a structure shown in FIG. 1 is arranged to add one or a plurality of separate pulses, as interference signal(s) to the composite color video signal, it may be possible to add several continuous pulses having a given high repetition frequency, as interference signals to the composite color video signal. In this case, it may be arranged such that the output pulse of a pulse width-determining monostable multivibrator, such as MM2, MM4 or the like, may be applied to a locked oscillator (not shown) so that a plurality of continuous output pulses, which have been oscillated in the locked oscillator within an interval of the pulse width of the above-mentioned output pulse, may be supplied via a level adjuster to the mixer-amplifier MA.

In the case of using the output pulse of the locked oscillator as an interference signal in this way, it is necessary to adjust the pulse width of the output pulse from the pulse width-determining monostable multivibrator.

FIGS. 3(b) through (j) are waveform charts showing typical examples of condition of adding interference signal which is added to the composite color video signal in the device for adding the interference signal according to the present invention. FIG. 3(a) is a waveform chart of a horizontal synchronous signal pulse included in the original composite color video signal, which is illustrated as a reference for clear understanding of the positions and conditions of addition of the interference signals shown in and after FIGS. 3(b).

In FIGS. 3(a) through (j), the reference Ph is a horizontal synchronous signal; Pb, a color burst; Ps1, Ps2 . . ., interference signals, and the above-mentioned interference signals Ps1, Ps2 . . . are added in at least one particular place in a portion which precedes the trailing edge "b" of the horizontal synchronous signal, where the interference signal has a pulse width considerably smaller than the pulse width of the horizontal synchronous signal Ph of the composite color video signal, and a level which does not project greatly beyond the peak portion of the horizontal synchronous signal Ph.

Since the interference signal(s) is added to the composite color video signal in the vicinity of each horizontal synchronous signal pulse, the interference signal(s) does not cause the occurrence of noises or distortion in the reproduced picture on the monitor image receiver.

Figures 3A, 3F:
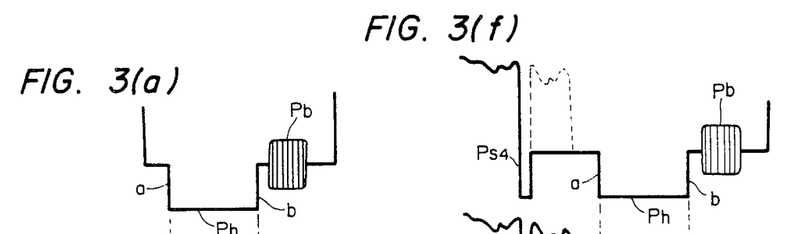
FIGS. 3(a) to 3(j) are enlarged waveform charts of the composite color video signal in the vicinity of horizontal synchronous signal, showing various ways of adding the interference signal(s)
Figures 3B, 3C, 3D, 3E, 3G, 3H, 3I, 3J:
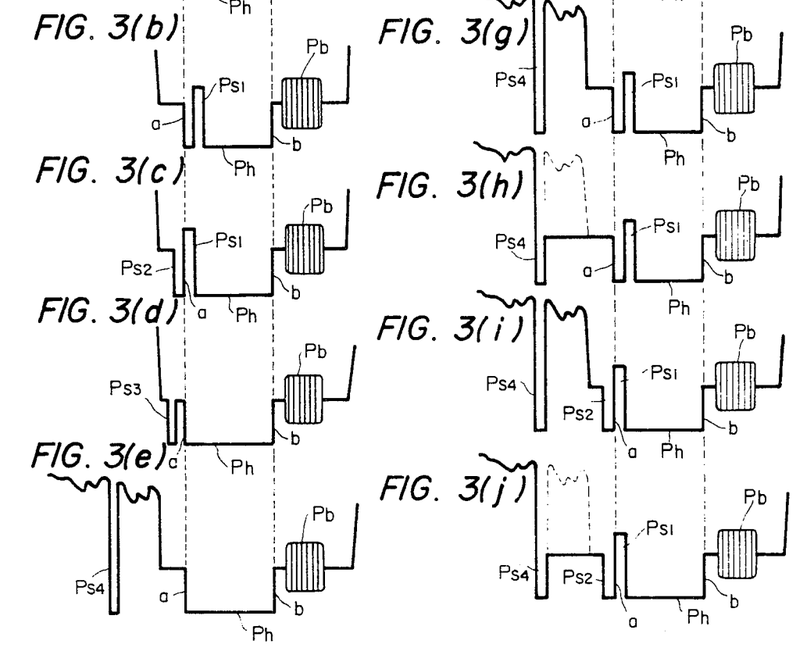

In an example of the waveform chart shown in FIG. 3(b), the interference signal Ps1 is a pulse added at a time position which is retarded slightly (for instance, 0.5 to 1.5 microseconds) from the time position of the leading edge "a" of the horizontal synchronous signal Ph, and the pulse has a width (for instance, 0.5 to 1.5 microseconds) considerably smaller than approximately 4.8 microseconds of the pulse width of the horizontal synchronous signal Ph, and is arranged to project to the pedestal level side, having its base at the peak, i.e. the lower portion of the negative going pulse in the diagrams, of the horizontal synchronous signal Ph.

In FIG. 3(b), although the interference signal Ps1 is shown as its peak is projecting upwardly from the pedestal level, the interference signal may be arranged such that the peak level of the pulse is substantially equal to the level of the pedestal level. Namely, it is preferable that the amplitude of the above-mentioned copy-proof interference pulse(s) may be substantially equal to or greater than (such as 1 to 1.5 times) the height of the horizontal synchronous signal Ph so that the interference pulse(s) is securely catched by a VTR when the composite color video signal including the interference signal is applied to the VTR.

In the example of the waveform chart of FIG. 3(c), the interference signal Ps1 is a narrow pulse (for instance, 0.5 to 1.5 microseconds) where its leading edge is coinciding with the leading edge "a" of the horizontal synchronous signal Ph, while another narrow negative going pulse Ps2 (for instance 0.5 to 1.5 microseconds), whose peak substantially corresponds to the peak of the horizontal synchronous signal, is added to the front porch portion.

The negative going pulse Ps2 of FIG. 3(c) is added in order to compensate for the decrease in the area of the horizontal synchronous signal pulse Ph caused by the addition of the positive going pulse Ps1. With this arrangement, the total energy of each horizontal synchronous signal pulse is substantially the same as that of normal horizontal synchronous signal pulse of FIG. 3(a). Such compensation by adding the negative going pulse Ps2 is a preferred embodiment, and similar effects will be obtained by the addition of the negative going pulse Ps2 even if the adding position of the interference signal Ps1, which is added in the horizontal synchronous signal Ph, is other than the position shown in FIG. 3(c).

The peak value of the pulse Ps1 in the case of FIG. 3(c) may be selected to 1 to 1.5 times the peak value of the horizontal synchronous signal Ph in the same manner as in the embodiment of FIG. 3(b).

Shown by an example of the waveform chart of FIG. 3(d) is one that a narrow negative going pulse Ps3 (0.5 to 1.5 microseconds), which rises at an instant slightly preceding (0.5 to 1.5 microseconds) the time position of the leading edge "a" of the horizontal synchronous signal Ph, is added to the front porch, and the above-mentioned pulse Ps3 is arranged such that its peak substantially corresponds to the peak of the horizontal synchronous signal Ph. As a result, a positive going pulse, which functions as a copy-proof interference signal, is left.

Shown by an example of a waveform chart of FIG. 3(e) is one that a narrow negative going pulse Ps4 (0.5 to 1.5 microseconds), which rises at an instant preceding the time position of the leading edge "a" of the horizontal synchronous signal Ph by 4 to 5 microseconds, is added to the front porch, and the above-mentioned pulse Ps4 is arranged such that its peak substantially corresponds to the peak of the horizontal synchronous signal Ph.

The pulse Ps4 shown in FIG. 3(e) is added to a video signal region which does not appear in the reproduced picture on the monitor image receiver. Since the last part of the video signal does not appear in the reproduced picture, the presence of the pulse Ps4 does not give any undesirable influences to the reproduced picture.

Shown by an example of a waveform chart of FIG. 3(f) is one in a condition that a pulse Ps4 is added at a time position in the same manner as in FIG. 3(e), while the video signal between the pulse Ps4 and the front porch is cancelled.

Shown by an example of a waveform chart of FIG. 3(g) is one in a condition that the above-described pulse Ps1 of FIG. 3(b) and the pulse Ps4 of FIG. 3(e) are combined. Shown by an example of a waveform chart of FIG. 3(h) is one in a condition that the above-described pulse Ps1 of FIG. 3(b) and the pulse Ps4 of FIG. 3(f) are combined. Furthermore, shown by an example of a waveform chart of FIG. 3(i) is one in a condition that the above-described pulses Ps1 and Ps2 of FIG. 3(c) and the pulse Ps4 of FIG. 3(e) are combined. Furthermore, shown by an example of a waveform chart of FIG. 3(j) is one in a condition that the above-described pulses Ps1 and Ps2 of FIG. 3(c) and the pulse Ps4 of FIG. 3(f) are combined.

FIGS. 3(b) through 3(j) show typical examples of the adding condition of the interference signals, and in practicing the present invention, one or more pulses may be used as (an) interference signal(s) at least one given place in a portion which precedes the trailing edge "b" of the horizontal synchronous signal Ph and does not substantially occur in the reproduced picture of the image receiver, where the pulse has a pulse width (0.5 to 1.5 microseconds) considerably smaller than the pulse width (approximately 4.8 microseconds) of the horizontal synchronous signal Ph, and an amplitude substantially equal to or greater than the height of the horizontal synchronous signal. The lower level of the interference signal is arranged such that it does not greatly project downwardly from the negative peak level of the horizontal synchronous signal. The interference signal is added at least one particular place in a portion which precedes the trailing edge of the horizontal synchronous signal and does not appear in the reproduced picture.

Although it has been described that one or more copy-proof interference signals are added to the composite color video signal in the vicinity of the horizontal synchronous signal in such a manner that at least one interference pulse is added to each horizontal synchronous signal pulse, similar results will be obtained by adding such an interference signal to some of the horizontal synchronous signal pulses. For instance, interference signal addition may be effected in connection with horizontal synchronous signal pulses of odd or even field.

Figure 4:
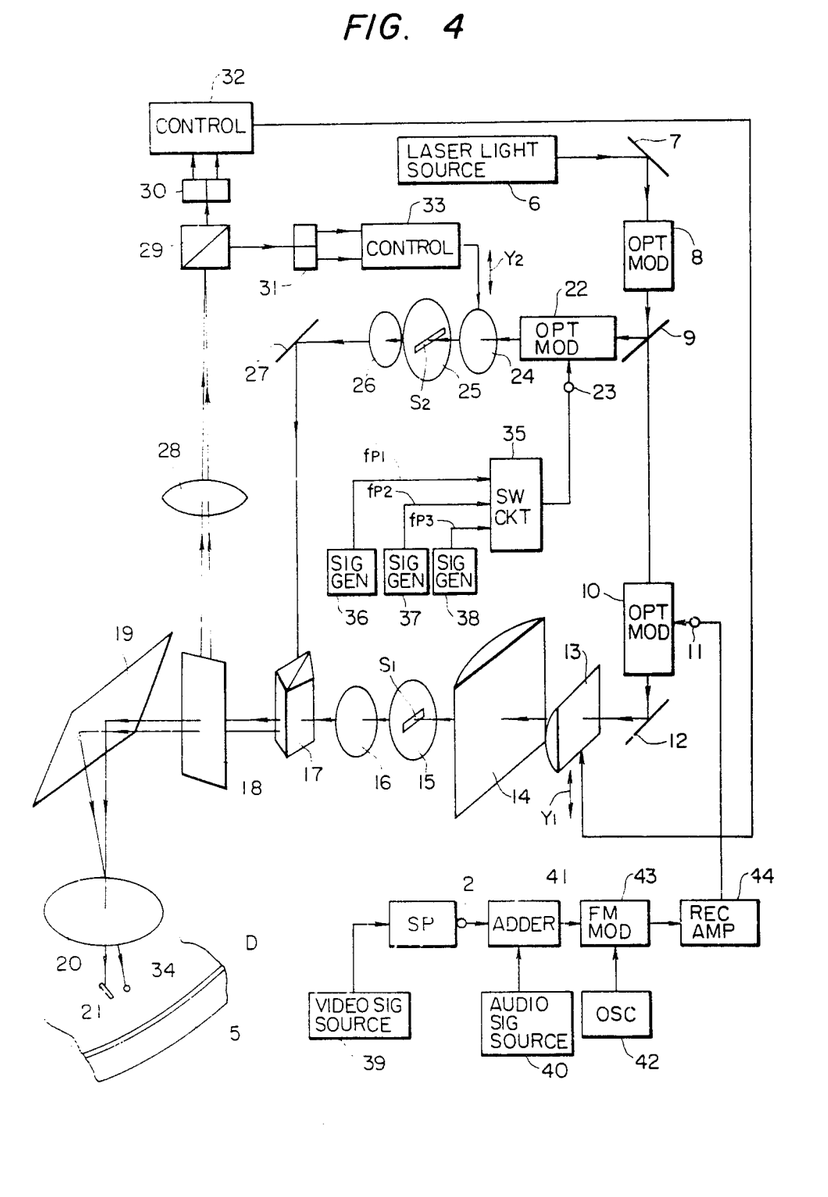
FIG. 4 is a schematic block diagram of a recording apparatus including the device of FIG. 1.

FIG. 4 is a block diagram showing an example of a recording apparatus which is used for recording the above-described copy-proof interference signal(s) together with a composite color video signal, as well as an audio signal attached to the composite color video signal and a given tracking control signals etc. In FIG. 4, the reference numeral 5 is a turntable, and this turntable 5 is rotated at a given rotational speed by an unshown motor and is transversely shifted by an unshown shifting mechanism.

On the turntable 5, is fixed a grooveless master disk D which is formed by depositing a photoresist layer on a substrate (for instance, a glass plate) having a flat surface. Recording is effected by making two laser light beam spots, which have been amplitude modulated respectively by an information signal and have given cross-sectional shapes, on the photoresist layer formed on the master disk D.

In FIG. 4, the reference numeral 6 is a laser light source; 7, a mirror; 8, an optical modulator for adjusting the amount of light (see Japanese Patent Provisional Publication No. 52-76003); 9 and 19, half-silvered mirrors; 10, an optical modulator for the main information; 11, a terminal; 7, 12, 19 and 27, reflectors; 13 and 14, cylindrical lenses; 15 and 25, slit members; S1 and S2, slits; 16, 24, 26 and 28, lenses; 20, an objective lens; 21 and 34, spots; 22, an optical modulator for a tracking control signal; 23, a terminal; 17 and 29, a polarizing prism; 30 and 31, position-deviation detectors; 32 and 33, control devices; and arrows Y1 and Y2 indicate the directions of displacement of the lens due to control. Detailed structure and operation of the arrangements designated at references 5 to 33 in FIG. 4 are described in detail in Japanese Patent Provisional Publication No. 54-123916, and therefore, further description is omitted.

To the terminal 23 of the optical modulator 22 for the tracking control signal is applied tracking signals fp1 and fp2, and a rotational phase reference signal fp3, etc. are applied from signal generators 36 to 38 via a switching circuit 35, while the main information signal, which has been frequency modulated, is applied to the terminal 11 of the main information signal optical modulator 10.

The reference numeral 39 is a signal source of the composite color video signal; SP, an interference signal-adding circuit, one example of which has been shown in FIG. 1; 40, a source of an audio signal to be attached to the composite color video signal; 41, an adder; 42, an oscillator; 43, a frequency modulator; and 44, a recording amplifier; and the output signal from the recording amplifier 44 is applied to the terminal 11 of the main information signal optical modulator 10 as the main information signal.

On the master disk D, recording tracks are made in the form of a pit arrangement by the main information signal, and tracking signals fp1 and fp2 having different frequencies are recorded in the form of a pit arrangement in such a manner that the tracking signals fp1 an fp2 are alternatively switched at an interval of one revolution of the master disk D between two adjacent tracks of the above-mentioned main information signal, while the rotation phase reference signal is recorded at the switching positions between the above-mentioned two tracking signals fp1 and fp2.

In this way, a master disk of no-guide groove video disks according to the reproduction method of the type of electrostatic capacitance-variation-detection (so called VHD method), is formed. From this master disk video disks (recorded recording media) may be produced in the same manner as well known producing methods of phonograph records.

Although a recording apparatus for a master disk of video disks of VHD method has been shown in FIG. 4, of course other type video disks may be produced by producing a master disk of video disks which can be optically reproduced without recording tracking signals.

When a video disk, on which a composite color video signal produced by the device for adding the copy-proof interference signal according to the present invention has been recorded in a given form, is played back by a video disk player to supply a reproduced signal to a monitor image receiver, it is possible to reproduce a satisfactory color TV picture on the monitor image receiver. However, when the reproduced signal from the video disk player is once recorded by a home-use VTR, and when a reproduced signal from the home-use VTR is applied to the monitor image receiver, it is impossible to reproduce a satisfactory color TV picture on the monitor image receiver, for instance, in a VTR of a particular sort, only nonpractical color pictures can be reproduced from the monitor image receiver with the reproduced signal from the home-use VTR due to color confusion, and in another type home-use VTR, only black and white pictures can be reproduced on the monitor image receiver. Namely, in any of home-use VTRs, when the reproduced signal from the video disk is once recorded by a home-use VTR, and the reproduced signal from the VTR is applied to the monitor image receiver, it is impossible to obtain a practical color picture.

Next, will be described the reasons that it is impossible to obtain a satisfactory color TV picture by a monitor image receiver with a reproduced signal from a home-use VTR after the composite color video signal, to which an interference signal has been added in the vicinity of the horizontal synchronous signal Ph as shown in FIGS. 3(b) to (j), is once recorded by the home-use VTR.

Figure 5:
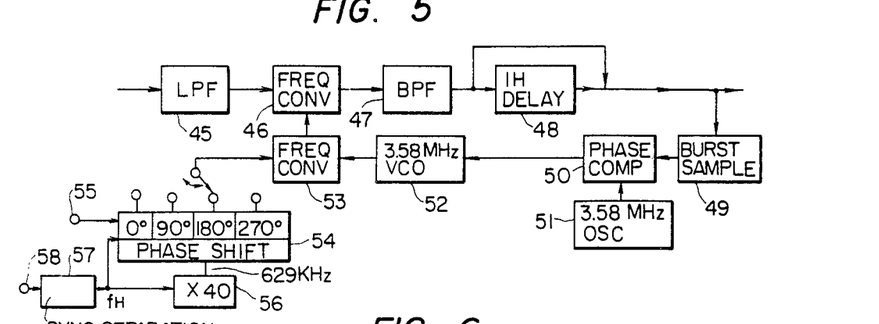
FIG. 5 is a schematic block diagram of a portion of a VTR of one type.
Figure 6:
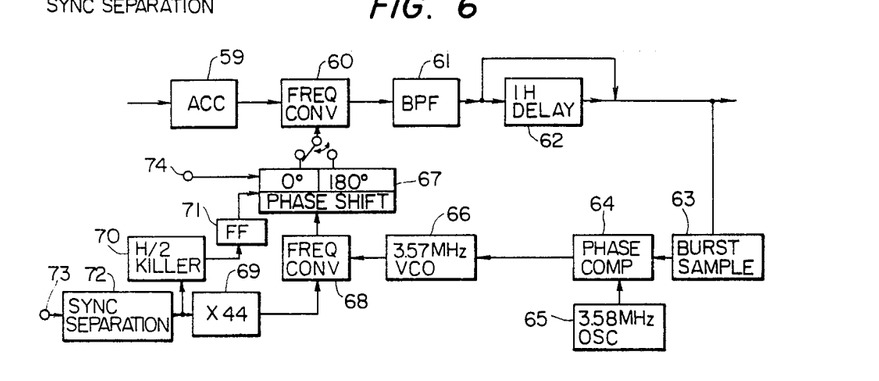
FIG. 6 is a schematic block diagram of a portion of a VTR of another type.

FIG. 5 is a block diagram of a portion of a home-use VTR according to the above-mentioned PS method, on reproduction, and FIG. 6 is a block diagram of a portion of a home-use VTR according to the above-mentioned PI method, on reproduction. In FIGS. 5 and 6, the reference numeral 45 is a low pass filter; 46, 53, 60 and 68, frequency converters; 47 and 61, band pass filters; 48 and 62, 1H delay circuits; 49 and 63, burst-sampling circuits; 50 and 64, phase comparators; 51 and 65, 3.58 MHz oscillators; 52, a 3.58 MHz VCO; 66, a 3.57 MHz VCO; 54 and 67, phase-shift circuits; 55 and 74, input terminals for signals indicative of the position of the rotary head; 56, a 40-times multiplier; 69, a 44-times multiplier; 57 and 72, synchronizing separation circuits; 58 and 73, input terminals of reproduced luminance signal; 59, an ACC circuit; 70, an H/2 killer circuit; and 71, a flip-flop.

In a home-use VTR according to either PS method or PI method, a low frequency conversion carrier chrominance signal, which has been phase-shifted by a given amount on recording, is phase-shifted, on reproduction, in an opposite direction to that on recording, and the above-mentioned operation on reproduction is effected in the portion shown in FIG. 5 in a home-use VTR according to the PS method, and in a portion of FIG. 6 in a home-use VTR according to the PI method. In a VTR according to either method, on the above-mentioned restoring operation of phase on reproduction, the horizontal synchronous signal included in the reproduced luminance signal is multiplied by the 40-times multiplier 56 or 44-times multiplier 69 to be used after separation by the synchronizing separation circuit 57 or 72.

Therefore, if an interference signal, such as shown in FIGS. 3(b) through 1(j), has been added in the vicinity of the horizontal synchronous signal of the signal reproduced by a home-use VTR, the operation of the portion of the circuit arrangement of FIG. 5 or FIG. 6 is disturbed by the interference signal so that correct phase-restoring operation will not be performed. As a result, correct color TV pictures would not be reproduced by a monitor image receiver when such a reproduced signal from a home-use VTR is supplied to the monitor image receiver.

Especially, in a home-use VTR, shown in FIG. 6, according to the PI method, the operation of the H/2 killer circuit 70 would be unstable when reproducing a composite color video signal, to which an interference signal such as shown in FIGS. 3(b) to (j) has been added, and therefore, satisfactory reproduced pictures would not be obtained when the reproduced signal is applied to a monitor image receiver.

Figure 7A:
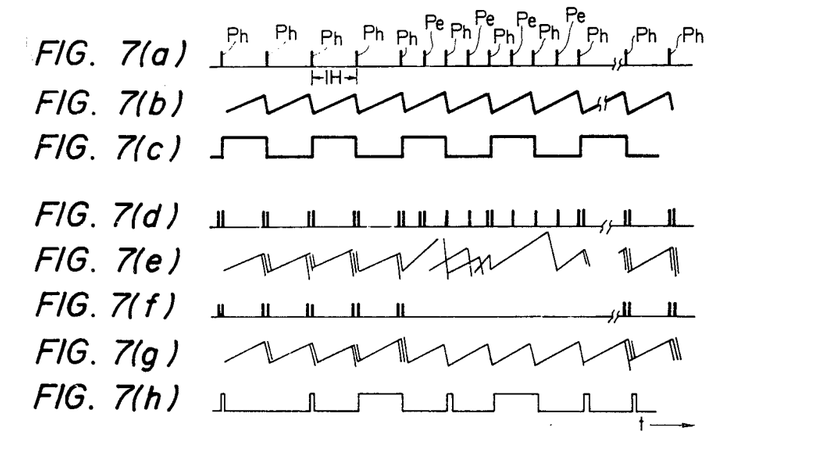

FIGS. 7(a) through 7(h) are waveform charts for explaining the condition that the operation of the H/2 killer circuit 70 becomes unstable. FIG. 7(a) shows a train of horizontal synchronous signals having no interference signal, where pulses Pe, Pe . . . of FIG. 7(a) are equalization pulses.

FIG. 7(b) is a waveform chart at the output side of the H/2 killer circuit 70 under the condition that the normal pulse train of FIG. 7(a) is applied to the H/2 killer circuit 70, and FIG. 7(c) is a waveform chart showing the output waveform of the flip-flop 71 in the case that the output signal from the H/2 killer circuit 70 corresponds to FIG. 7(b).

In the case that an interference signal has been added in the vicinity of the horizontal synchronous signal of the composite color video signal, in either case, that the signal to be applied to the H/2 killer circuit 70 is of FIG. 7(d) (the case that the interference signal is also added in the vertical blanking interval) or of FIG. 7(f) (the case that the interference signal is not added in the vertical blanking interval), the waveform of the output side of the H/2 killer circuit 70 would be disturbed as shown in FIG. 7(e) and FIG. 7(g). Therefore, the output waveform of the flip-flop 71, which operates by being triggered by the output signal of the H/2 killer circuit 30, becomes irregular as shown for instance, in FIG. 7(h), and accordingly, phase-shifting condition in the phase-shifter 67 would be totally confused.

Although the adding position of such an interference signal, which is capable of disturbing the operation of the H/2 killer circuit 70, may be any place in a portion between a midway portion in the pulse width of the horizontal synchronous signal Ph and a half portion of the video signal period which precedes the horizontal synchronous signal, since it is necessary to avoid an adding condition that the interference signal appears in the reproduced picture, addition of the interference signal should be done at a point between the midway portion in the pulse width of the horizontal synchronous signal and a point which preceds the leading edge of the horizontal synchronous signal 4 to 5 microseconds.

Next, in the case that the peak portion of the horizontal synchronous signal is fixed at a predetermined potential by using a pulse clamping circuit when recording by a home-use VTR, since the interference signal, which has been added to the horizontal synchronous signal, disturbs the clamping operation of the composite color video signal in the pulse clamping circuit, only reproduced pictures, whose horizontal synchronization has been disturbed, are obtained by a monitor image receiver when such a composite color video signal reproduced from such a home-use VTR is applied to the monitor image receiver.

Figure 8:
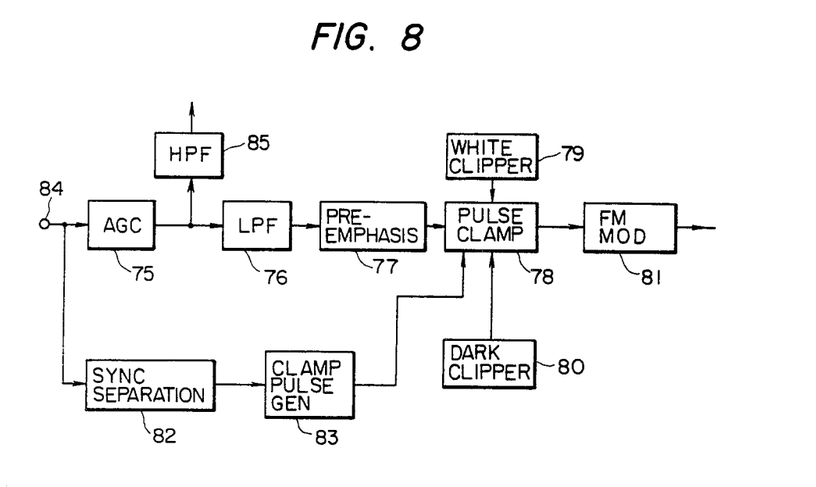
FIG. 8 is a schematic block diagram of a portion of a VTR of another type.
Figures 9A, 9B, 9C:
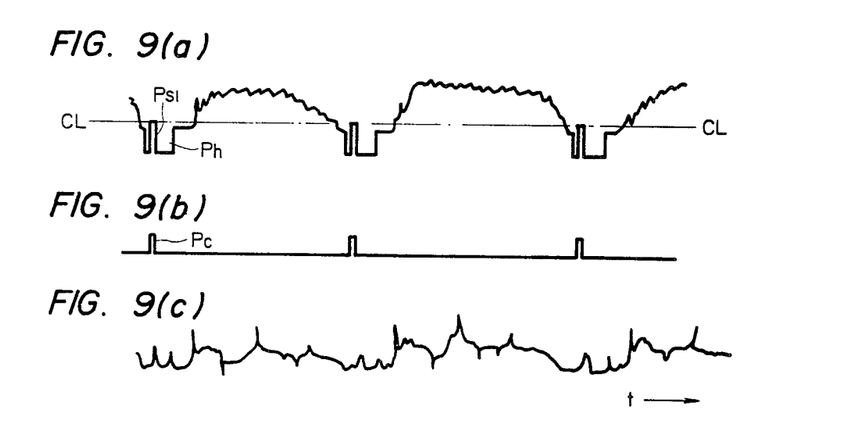
FIGS. 9(a) to 9(c) are waveform charts useful for understanding the operation of the circuit of FIG. 8.

FIG. 8 is a block diagram showing an example of the recording system of a home-use VTR equipped with a pulse clamping circuit, and FIGS. 9(a) to 9(c) are waveform charts for the description of the operation of the circuit arrangement of FIG. 8.

In FIG. 8, the reference numeral 75 is an AGC circuit; 76, a low pass filter; 77, a preemphasis circuit; 78, a pulse clamping circuit; 79, a white clipper; 80, a dark clipper; 81, an FM modulator; 82, a synchronizing separation circuit; and 83, a clamping pulse generating circuit.

In FIG. 8, the composite color video signal applied to the terminal 84 is applied via the AGC circuit 75 to the high pass filter 85 and low pass filter 76, and in the high pass filter 85, the chromatic signal in the composite color video signal is extracted to be sent to a color processing circuit which is not shown, and on the other hand, in the low pass filter 76, a signal (FIG. 9(a)) comprising a luminance signal component and a composite color video signal is applied to the preemphasis circuit 77. The preemphasis circuit 77 reinforces the high frequency component of the given signal applied thereto to supply the same to the clamping circuit 78.

The clamping circuit 78 fixes the potential of the peak portion of the horizontal synchronous signal to a predetermined potential, and this is essential for setting the reference frequency of an FM signal wave by fixing the D.C. level of the luminance signal to a predetermined potential on frequency modulation. The white clipper 79 is provided in connection with the clamping circuit 78 for preventing the inversion on signal recording, and the dark clipper 80 may be provided in connection with the clamping circuit 78.

A clamping pulse, which is applied to the clamping circuit 78, is generated by the clamping pulse generating circuit 83, on the basis of the horizontal synchronous pulse which has been separated from the synchronizing separation circuit 82. The clamping pulse Pc is one, as shown in FIG. 9(b), which is retarded 1 microsecond or so from the leading edge of the horizontal synchronous signal Ph and has a pulse width of 1 microsecond or so.

Namely, equalization pulses each having a pulse width which is narrower than the horizontal synchronous signal, reside in the vertical blanking interval of the composite color video signal, and it is necessary that the clamping pulse is positioned at a time point which is 1 microsecond behind the leading edge of the pulse to be clamped, and has a pulse width of 1 microsecond or so in order to fix the equalization pulses to a predetermined potential by the pulse clamping circuit 78.

In the case that the clamping operation in the clamping circuit 78 is performed by the clamping pulse Pc shown in FIG. 9(b), if the signal to be clamped is one to which the interference signal Ps1 has been added in the horizontal synchronous signal Ph as shown in FIG. 9(a), it is a matter of course that the clamping operation in the clamping circuit 78 with respect to the signal to be clamped is effected in connection with the peak portion of the interference signal Ps2, and in this case, the signal to be clamped is clamped in such a manner that the line CL—CL in FIG. 9(a) is fixed to a predetermined potential.

Since the dark clipper 80, which is provided in connection with the clamping circuit 78, operates so that signal portions below a predetermined level are clipped on the basis of the reference level CL—CL, in the case that the clamping level is determined as CL—CL of FIG. 9(a), most portions of the horizontal synchronous signal are removed by the dark clipper 80, and therefore the signal applied from the clamping circuit 78 to the FM modulator 81 assumes a state as shown in FIG. 9(c).

Therefore, it is apparent that only horizontal synchronization disturbed reproduced pictures are reproduced when signals recorded and reproduced by a home-use VTR equipped with such a recording system are applied to a monitor image receiver.

In the recording system having the arrangement shown in FIG. 8, the operation of the clamping pulse generating circuit is disturbed in the presence of the interference signal in the horizontal synchronous signal, so that produced clamping pulse becomes abnormal, resulting in abnormal clamping operation of the clamping circuit 78.

From the foregoing description, it will be understood that the technique of adding one or more interference signals to the composite color video signal in the vicinity of the horizontal synchronous signal according to the present invention provides a recorded recording medium which is substantially copy-proofed because only nonpractical pictures, such as scrambled or confused color pictures or black and white pictures, are obtained when intending to reproduce the recorded information after being recorded to a VTR. Since the amplitude of the interference signal added to the composite color video signal is a little greater than the height of the horizontal synchronous signal, and since the base line of the interference signal corresponds to the peak of the negative going pulse of the horizontal synchronous signal, the dynamic range of the composite color video signal is not widened at all. Therefore, it is possible to readily emit a reproducing signal having satisfactory S/N from a reproducing player of the composite color video signal-recorded recording medium. Since the present invention provides the above-described copy-proof technique, it is possible to readily invalidate steal-copying from video disks, video tapes or the like by home-use VTRs.

In addition, it is useful to further completely prevent steal-copying by VTRs by a new interference signal to the reproducing signal emitted from a reproducing player by providing an interference signal generating device, such as written in the specifications of Japanese patent applications Nos. 55-75348 and 55-100047, in the reproducing player of composite color video signal-recorded recording medium according to the present invention.

Moreover, in practicing the present invention, an interference signal whose peak portion slightly projects beyond the peak portion of the horizontal synchronous signal may be added to the composite color video signal.

As described in the above, according to the present invention the aforementioned conventional problems can be satisfactorily resolved, so that video disks, video tapes or the like, which can readily invalidate steal-copying by home-use VTRs, can be provided.

The above-described embodiments are just examples of the present invention, and therefore, it will be apparent for those skilled in the art that many modifications and variations may be made without departing from the spirit of the present invention.

What is claimed is:

1. A copy-proof recording medium carrying a composite color video signal to which a copy-proof interference signal has been added so that said interference signal will cause a synchronous separation circuit of a video signal recording apparatus to produce a false horizontal synchronous signal when said composite color video signal of said medium is recorded by said video recording apparatus, said interference signal having a pulse which is synchronous with a horizontal synchronous pulse of said composite color video signal, said pulse of said interference signal having a width considerably smaller than the pulse width of the horizontal synchronous signal of said composite color video signal, said interference signal being added in at least one particular place, within the horizontal synchronous signal, at a position which precedes a midway point of the horizontal synchronous signal, said interference signal being a positive-going pulse which rises from the level of the tip of the horizontal synchronous signal to a level equal to or greater than the pedestal level, the position, the amplitude and the width of said pulse of said interference signal being maintained constant.

2. A copy-proof recording medium as claimed in claim 1, wherein said composite color video signal comprises a negative going pulse in the vicinity of the leading edge of said horizontal synchronous signal for compensating for decrease in area defined by a single pulse of said horizontal synchronous signal, which decrease is caused by addition of said interference signal.

3. A copy-proof recording medium as claimed in claim 2, wherein said negative going pulse is added to the front porch of said horizontal synchronous signal pulse.

4. A copy-proof recording medium as claimed in claim 1, wherein said interference signal is added to each pulse of said horizontal synchronous signal.

5. A copy-proof recording medium as claimed in claim 1, wherein said interference signal is added to some pulses of said horizontal synchronous signal.

6. A device for adding at least one copy-proof interference signal to a composite color video signal so that said interference signal will cause a synchronous separation circuit of a video signal recording apparatus to produce a false horizontal synchronous signal when said composite color video signal is recorded by said video recording apparatus, comprising: first means responsive to the horizontal synchronous signal of said composite color video signal for producing a pulse train which is synchronous with a horizontal synchronous pulse of said composite color video signal; second means for defining the width of pulses of said pulse train so that said pulse has a width considerably smaller than the pulse width of the horizontal synchronous signal of said composite color video signal; and third means for adding said pulse to said composite color video signal such that said interference signal is added in at least one particular place, within the horizontal synchronous signal, at a position which precedes a midway point of the horizontal synchronous signal, said interference signal being a positive-going pulse which rises from the level of the tip of the horizontal synchronous signal to a level equal to or greater than the pedestal level, the position, the amplitude and the width of said first pulse of said interference signal being maintained constant.

7. A device as claimed in claim 6, wherein said third means comprises a mixer-amplifier.

8. A device as claimed in claim 6, wherein said first means comprises a first monostable multivibrator responsive to a pulse synchronous with said horizontal synchronous signal.

9. A device as claimed in claim 8, wherein said first means comprises a second monostable multivibrator responsive to an output pulse of said first monostable multivibrator.

10. A device as claimed in claim 9, further comprising a level adjuster for adjusting the amplitude of the output pulse of said second monostable multivibrator.

11. A device as claimed in claim 9, further comprising a third monostable multivibrator responsive to a pulse synchronous with said horizontal synchronous signal and a fourth monostable multivibrator responsive to the output pulse of said third monostable multivibrator.

12. A device as claimed in claim 11, further comprising a first level adjuster for adjusting the amplitude of the output pulse of said second monostable multivibrator and a second level adjuster for adjusting the amplitude of the output pulse of said fourth monostable multivibrator.

* * * * *